US010205553B2

(12) United States Patent
Magri et al.

(10) Patent No.: US 10,205,553 B2
(45) Date of Patent: Feb. 12, 2019

(54) APPARATUS FOR PROTECTING AN OPTICAL LINK

(71) Applicant: Telefonaktiebolaget LM Ericsson (publ), Stockholm (SE)

(72) Inventors: Roberto Magri, Pisa (IT); Alberto Deho, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/746,610

(22) PCT Filed: Jul. 27, 2015

(86) PCT No.: PCT/EP2015/067193
§ 371 (c)(1),
(2) Date: Jan. 22, 2018

(87) PCT Pub. No.: WO2017/016592
PCT Pub. Date: Feb. 2, 2017

(65) Prior Publication Data
US 2018/0212700 A1 Jul. 26, 2018

(51) Int. Cl.
*H04B 10/00* (2013.01)
*H04J 14/02* (2006.01)
(Continued)

(52) U.S. Cl.
CPC .......... *H04J 14/029* (2013.01); *H04B 10/032* (2013.01); *H04B 10/071* (2013.01);
(Continued)

(58) Field of Classification Search
USPC ............................................. 398/1–8, 66–73
See application file for complete search history.

(56) References Cited

U.S. PATENT DOCUMENTS 5,680,235 A * 10/1997 Johansson .............. H04B 10/27
398/4
6,038,211 A * 3/2000 Lemaire .................... H04J 3/14
370/216
(Continued)

OTHER PUBLICATIONS

Wang, Zhaoxin et al., "A Simple Single-Fiber CWDM Metro/Access Ring Network with Unidirectional OADM and Automatic Protection", OFA2, Mar. 6, 2005, 1-3.

*Primary Examiner* — Agustin Bello
(74) *Attorney, Agent, or Firm* — Murphy, Bilak & Homiller, PLLC

(57) ABSTRACT

According to the present invention, there is provided apparatus for providing protection of an optical link. The apparatus comprises a first port for coupling to the optical link and a second port for coupling to a further optical link. The apparatus further comprises a third port configured to receive an upstream optical signal to be transmitted over the optical link, and to output a downstream optical signal received over the optical link. The apparatus further comprises protection switching apparatus operable to selectively couple the third port to the first port or to the second port. The apparatus further comprises modifying apparatus configured to modify the upstream optical signal, received at the third port, before it is output from the first port, such that the switching upstream optical signal has a distinctive physical characteristic. The apparatus further comprises detecting apparatus, coupled between the first port and the third port, configured to receive a portion of an incoming optical signal, received at the first port, and to selectively detect the presence of the upstream optical signal or the downstream optical signal in the portion of the incoming signal based on the distinctive physical characteristic. The apparatus further comprises control circuitry configured to provide a control (Continued)

signal to the protection switching apparatus based on an output from the detecting apparatus.

20 Claims, 11 Drawing Sheets

(51) Int. Cl.
    *H04B 10/071*     (2013.01)
    *H04B 10/032*     (2013.01)
    *H04Q 11/00*     (2006.01)

(52) U.S. Cl.
    CPC ...... *H04J 14/0291* (2013.01); *H04Q 11/0005* (2013.01); *H04Q 11/0066* (2013.01); *H04Q 2011/0009* (2013.01); *H04Q 2011/0049* (2013.01); *H04Q 2011/0079* (2013.01); *H04Q 2011/0081* (2013.01)

(56) References Cited

U.S. PATENT DOCUMENTS

| | | | | |
|---|---|---|---|---|
| 6,101,012 A * | 8/2000 | Danagher | H04J 14/0212 | 398/1 |
| 6,160,648 A * | 12/2000 | Oberg | H04B 10/03 | 370/222 |
| 6,477,288 B1 * | 11/2002 | Sato | H04J 14/0283 | 385/16 |
| 6,493,088 B1 * | 12/2002 | Hui | G01J 9/02 | 356/450 |
| 6,975,586 B1 * | 12/2005 | Yoshimura | H04B 10/032 | 370/217 |
| 7,174,096 B2 * | 2/2007 | Berthold | H04B 10/2503 | 398/1 |
| 7,184,660 B2 * | 2/2007 | Liu | H04B 10/00 | 398/13 |
| 7,406,260 B2 * | 7/2008 | MacDonald | H04L 41/0659 | 370/241 |
| 7,409,154 B2 * | 8/2008 | Wellen | H04Q 11/0067 | 398/12 |
| 7,561,799 B2 * | 7/2009 | Togawa | G02B 6/3562 | 385/16 |
| 7,603,033 B1 * | 10/2009 | Lumetta | H04B 10/03 | 398/5 |
| 8,078,052 B2 * | 12/2011 | Aprile | H04J 14/029 | 398/10 |
| 8,218,964 B2 * | 7/2012 | Tanzi | H04J 14/0298 | 398/1 |
| 8,244,123 B2 * | 8/2012 | Sugahara | H04B 10/032 | 398/1 |
| 8,326,144 B2 * | 12/2012 | Yamaguchi | H04B 10/0795 | 398/105 |
| 8,699,354 B2 * | 4/2014 | Patel | H04B 10/077 | 370/242 |
| 8,705,955 B2 * | 4/2014 | Grobe | H04J 14/0282 | 398/1 |
| 10,063,313 B1 * | 8/2018 | Al Sayeed | H04B 10/032 | |
| 2002/0003639 A1 * | 1/2002 | Arecco | H04J 14/022 | 398/59 |
| 2003/0011855 A1 * | 1/2003 | Fujiwara | H04B 10/0771 | 398/177 |
| 2004/0213567 A1 * | 10/2004 | Deguchi | H04B 10/03 | 398/32 |
| 2005/0207753 A1 * | 9/2005 | Touma | H04B 10/032 | 398/32 |
| 2007/0065149 A1 * | 3/2007 | Stevens | H04J 14/00 | 398/45 |
| 2007/0140688 A1 * | 6/2007 | Patel | H04B 10/077 | 398/5 |
| 2009/0226163 A1 * | 9/2009 | Sugahara | H04B 10/032 | 398/17 |
| 2010/0284687 A1 * | 11/2010 | Tanzi | H04J 14/029 | 398/1 |
| 2011/0317995 A1 * | 12/2011 | Zheng | H04J 14/0282 | 398/2 |
| 2013/0028592 A1 * | 1/2013 | Fujii | H04Q 11/0005 | 398/5 |
| 2015/0003822 A1 * | 1/2015 | Fukada | H04B 10/032 | 398/2 |
| 2018/0212700 A1 * | 7/2018 | Magri | H04B 10/071 | |

* cited by examiner

Option 1
Tone super-imposed on
Control signal

Option 2
VOA to generate tone

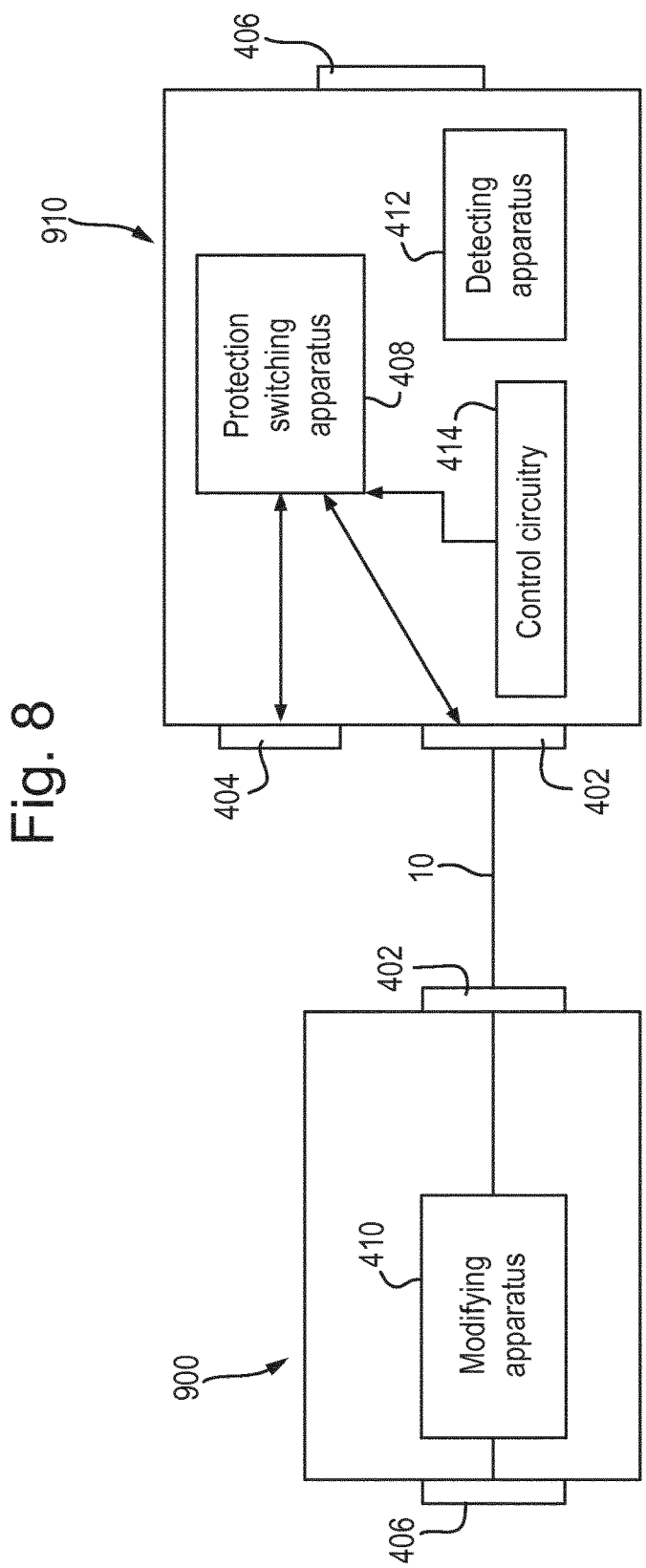

US 10,205,553 B2

APPARATUS FOR PROTECTING AN OPTICAL LINK

TECHNICAL FIELD

The present invention relates to apparatus for protecting an optical link. The present invention also relates to an optical network, and to a radio access network comprising the optical network. The present invention further relates to a method for upgrading an optical network to provide protection for an optical link.

BACKGROUND

Optical networks are considered attractive for use in radio access networks, such as mobile front-haul networks. For example, in a mobile front-haul network, an optical network, such as a wavelength division multiplexed (WDM) optical network, may be used to couple a baseband processing unit to a plurality of remote radio units.

Separate optical fibres may be used to convey upstream and downstream optical signals respectively between the baseband processing unit and the remote radio units. However, using a single optical fibre to transmit both the upstream and downstream optical signals may save costs, which is particularly desirable in radio access networks. This is not only because fewer optical fibres may be required to transmit all of the optical signals, but also because fewer associated components such as splitters, couplers and splice enclosures may be required. Further, capital and labour costs associated with lighting up fibre may be reduced, and capital investment in fibre installations may thus be maximised. Better use may be made of existing dark fibre, and thus the "time to trench" may be extended. For example, instead of laying additional fibres, metro area networks nearing fibre exhaust, which currently use two fibres for transmission of upstream and downstream optical signals respectively, could be upgraded for single fibre operation.

In single fibre operation, in order to mitigate Rayleigh-Backscattering x-talk between the upstream and downstream optical signals, which can severely limit network performance, the upstream and downstream optical signals will typically have different wavelengths.

SUMMARY

The Applicant has appreciated that it would be desirable to provide protection of an optical link, for example an optical fibre, which is arranged to carry optical signals in an upstream direction and a downstream stream direction (i.e. in opposite directions) at the same time.

FIGS. 1a and 1b show protection apparatus suitable for protecting an optical link 10 used for transmission of optical signals in a single direction only. FIG. 1a shows a 1+1 protection scheme.

FIG. 1b shows a 1:1 protection scheme. In both Figures, there is a further optical link 12, indicated by a dashed line, which can be used to carry the signals travelling over optical link 10, in the event that optical link 10 fails, for example because of an optical fibre cut or other defect. A protection switch 14 (shown on the left hand side of the Figures) is coupled, at a first port 16, to an end of the optical link 10 and, at a second port 18, to an end of the further optical link 12. The protection switch 14 has a further port 20 configured to receive one or more upstream optical signals for transmission over the optical link 10. The protection switch 14 is however operable to selectively couple the further port 20 to the first port 16 or to the second port 18, whereby the one or more upstream optical signals, received at the further port 20, may be transmitted from the first port 16 over the optical link 10, or from the second port 18 over the further optical link 12.

In the 1+1 protection scheme, shown in FIG. 1a, at the opposite end of the optical links 10, 12, there is a 2:N splitter 22, which has a first port 24 coupled to optical link 10 and a second port 26 coupled to further optical link 12. The 2:N splitter 22 is configured to split the one or more upstream optical signals, received over optical link 10 or further optical link 12, into respective optical signals to be transmitted, over further optical links, to respective optical receivers (not shown).

In the 1:1 line protection scheme, at the opposite end of the optical links 10, 12, there is instead a second protection switch 28. This protection switch 28 also has a first port 30, for coupling to the other end of the optical link and a second port 32, for coupling to the other end of the further optical link 12. This protection switch 28 has a further port 34 configured to output the one or more upstream optical signals. The protection switch 28 is operable to selectively couple the further port 34 to the first port 30 (i.e. to the optical link) or to the second port (i.e. to the further optical link 12). The further port 34 of the protection switch 28 is coupled to a band filter 36, which is configured to split the one or more upstream optical signals output from the protection switch 28 into respective optical signals for transmission to respective optical receivers (again not shown).

It should be noted that from the perspective of the 2:N splitter 22/second protection switch 28 the "upstream" optical signals are "downstream" optical signals.

Each protection switch 14, 28, in both the 1+1 and 1:1 line protection system, has a power tap monitor (not shown) which is configured to receive a portion of an incoming optical signal, received at the first port 16 30 of the protection switch 14, 28. In protection switch 14, which is configured to transmit the upstream optical signals over the optical link 10, if the power monitor detects the presence of an incoming optical signal, this may indicate that the optical link 10 is cut or otherwise damaged. This is because this may mean that the one or more upstream optical signals are being reflected back to the first port 16, for example from a cut interface along the optical link. On the other hand, in protection switch 28, if the power monitor detects loss of an incoming signal, received at port 30, this may also indicate that the optical link 10 is cut or otherwise damaged, since it may mean that the "upstream" optical signals are not passing along the length of optical link 10. In both cases, in response to this detection, the protection switch 14, 28 couples the further port 20 34 to the second port 18 32, such that the upstream optical signals are transmitted over, and received from, the further optical link 12, instead of the first port 16.

Thus, protection of optical link 10 may be achieved, in a simple manner, and thus in a cost effective and reliable way.

However, the applicant has appreciated that this system does not work for an optical link which is arranged to carry both upstream and downstream optical signals, i.e. optical signals travelling in opposite directions. This is because, if for example the optical link is cut, not only will the upstream optical signals transmitted from one end of the optical link be reflected back to that end of the optical link, but the downstream optical signals transmitted from the other end of the optical link will not reach that end of the optical link. The net result is that there may be no appreciable change in the optical power detected by the power monitor, in the event of an optical link cut or other defect. Or, if there is a change, it may be tricky to perform a proper threshold calibration, which threshold may need to be adjusted if network parameters such as transmission power/number of upstream and downstream signals change.

This problem is illustrated in FIG. 2. In this example, it is seen that a plurality of upstream optical signals (even lambdas 2 to 48) are transmitted from protection switch 14, over optical link 10. Light from these signals is reflected back to protection switch 14, from a cut along optical link 10 indicated by a X. Downstream optical signals (from the perspective of protection switch 14) (odd lambdas 1 to 47) are also transmitted over optical link 10, towards protection switch 14. However, these signals are blocked from reaching protection switch 14 by cut X.

One way of protecting optical link 10 would be to insert a wavelength filter before the power monitors in the protection switches 14, 28, wherein the wavelength filter is configured to pass only light from the upstream optical signals or the downstream optical signals. In this way, presence or loss of the upstream optical signals or the downstream optical signals may be selectively detected, and thus an optical link fault may still be detected as described above. However, the applicant has appreciated that a disadvantage of this solution is that the network wavelength plan cannot be changed, without reconfiguring the protection apparatus. This may result in less efficient operation of the network, by preventing or limiting dynamic switching of the wavelength plan. And or increase costs, by requiring manual replacement of the wavelength filter in each protection apparatus, each time it is desired to change the wavelength plan. Or, by requiring inclusion of a tuneable wavelength filter in each protection switch 14, 28, which may be more expensive than a passive filter, and optionally complex control circuitry to communicate for example with a network management system to adjust the wavelength filter automatically when required.

An alternative solution, for example as described in an article titled "A simple single-fibre CWDM metro/access ring network with unidirectional OADM and automatic protection switching" OFC 2005 is to monitor each downstream optical signal dropped by a respective Optical Add Drop Multiplexer (OADM) in the network. However, the applicant has appreciated that this approach has the further disadvantage that the optical nodes in the network may need to be upgraded in order to provide protection of the optical link. And the solution may not even be feasible in all network architectures. Complex control circuitry may also be required in order to trigger protection of the optical link in the event of a detection of Loss of Signal, LOS. For example, co-ordination with other network elements or a network controller may be required.

According to the present invention, there is provided apparatus for providing protection of an optical link. The apparatus comprises a first port for coupling to the optical link and a second port for coupling to a further optical link. The apparatus further comprises a third port configured to receive an upstream optical signal to be transmitted over the optical link, and to output a downstream optical signal received over the optical link. The apparatus further comprises protection switching apparatus operable to selectively couple the third port to the first port or to the second port. The apparatus further comprises modifying apparatus configured to modify the upstream optical signal, received at the third port, before it is output from the first port, such that the upstream optical signal has a distinctive physical characteristic. The apparatus further comprises detecting apparatus, coupled between the first port and the third port, configured to receive a portion of an incoming optical signal, received at the first port, and to selectively detect the presence of the upstream optical signal or the downstream optical signal in the portion of the incoming signal based on the distinctive physical characteristic. The apparatus further comprises control circuitry configured to provide a control signal to the protection switching apparatus based on the detecting by the detecting apparatus.

Embodiments of the present invention have the advantage that they can provide protection of an optical link arranged to carry both upstream and downstream optical signals, in a simpler, more cost effective and more reliable way. Advantageously, the solution of the present invention is independent of the wavelength plan of the optical network, and thus the wavelength plan may be adjusted dynamically so as to improve network performance, without requiring reconfiguration of the apparatus. Further, no modifications are required to other network elements such as OADMs, HUB. The solution is self-contained, and thus advantageously an optical network may be easily upgraded to provide protection of an optical link using apparatus embodying the present invention.

According to an embodiment of the present invention, the control circuitry may be configured to cause the protection switching apparatus to selectively couple the third port to the second port instead of to the first port if the detecting apparatus detects the presence of the upstream optical signal in the portion of the incoming optical signal. Alternatively, the control circuitry may be configured to cause the protection switching apparatus to selectively couple the third port to the second port instead of to the first port if the detecting apparatus does not detect the presence of the downstream optical signal in the portion of the incoming optical signal.

According to a preferred embodiment of the present invention, the modifying apparatus may comprise a modulating apparatus configured to modulate the upstream optical signal, wherein the distinctive physical characteristic is a modulation. The modulation may be an amplitude modulation, a phase modulation or a frequency modulation. Preferably, the modulation is a tone modulation. This means that the modulation is applied to a narrow portion of the bandwidth of the upstream optical signal, for example at a single frequency of the upstream optical signal. For example, the modulation may be a weak modulation applied at a low frequency, such as less than 5 Hz. The modulation does not carry any digital information.

Thus, applying a modulation to the upstream optical signal may "mark" the upstream optical signal such that it can be distinguished from the downstream optical signal. However, advantageously, the modulation may have no significant impact on the upstream optical signal, such that it is not necessary to remove the modulation after the upstream optical signal has traveled over the optical link. The modulation may merely be perceived by the upstream optical signal receiver as a noise, which can be filtered out using conventional techniques. Thus, this may provide a simple, cost effective and reliable way of adding a distinctive physical characteristic to the upstream optical signal.

According to a preferred embodiment, the modulating apparatus may be configured to provide a modulating signal to the protection switching apparatus, whereby when the upstream optical signal passes through the protection switching apparatus the modulation is applied to the upstream optical signal.

According to a preferred embodiment, the detecting apparatus may comprise a modulation detector configured to detect the presence of the modulation in the portion of the incoming optical signal. For example, the detecting apparatus may also comprise an optical power detector configured to convert the portion of the incoming optical signal into an electrical signal, and the modulation detector may be configured to detect the modulation in the electrical signal. This may provide a simple, cost effective, reliable arrangement.

Alternatively, the modifying apparatus may, for example, be configured to add an optical signal to the upstream optical signal at a distinctive frequency, wherein the distinctive frequency is the distinctive physical characteristic. In this example, the detecting apparatus may comprise a wavelength filter configured to selectively pass optical signals at the distinctive frequency. The detecting apparatus may further comprise an optical power detector configured to detect the optical signal(s) passed by the wavelength filter.

According to the present invention, there is also provided a system for protecting an optical link. The system comprises a first apparatus comprising a first port for coupling to a first end of the optical link, a third port configured to receive an upstream optical signal to be transmitted over the optical link, and to output a downstream optical signal received over the optical link. The first apparatus further comprises modifying apparatus configured to modify the upstream optical signal, received at the third port, before it is output from the first port, such that the upstream optical signal has a distinctive physical characteristic.

The system further comprises a second apparatus comprising a first port for coupling to second end of the optical link, a second port for coupling to a further optical link, and a third port configured to receive an upstream optical signal to be transmitted over the optical link, and to output a downstream optical signal received over the optical link. The second apparatus further comprises protection switching apparatus operable to selectively couple the third port to the first port or to the second port. In addition, the second apparatus further comprises detecting apparatus, coupled between the first port and the third port. The detecting apparatus is configured to receive a portion of an incoming optical signal, received at the first port, and to selectively detect the presence of the upstream optical signal or the downstream optical signal in the portion of the incoming signal based on the distinctive physical characteristic. The second apparatus further comprises control circuitry configured to provide a control signal to the protection switching apparatus based on the detecting by the detecting apparatus.

According to the present invention, there is also provided an optical network comprising an optical link, a further optical link, and an apparatus or system for providing protection of the optical link as described above.

There is also provided a radio access network comprising the optical network.

There is also provided a method of upgrading an optical network to provide protection of an optical link. The method comprises providing an apparatus as described above. The method further comprises coupling the first port of the apparatus to the optical link, coupling the second port of the apparatus to a further optical link, and coupling the third port of the apparatus to a network part arranged to output an upstream optical signal and to receive a downstream optical signal.

There is also provided a further method of upgrading an optical network to provide protection of an optical link. The method comprising providing a system as described above. The method further comprises coupling the first port of the first apparatus to a first end of the optical link, and coupling the third port of the first apparatus to a network part arranged to output an upstream optical signal and to receive a downstream optical signal. The method further comprises coupling the first port of the second apparatus to a second end of the optical link, coupling the second port of the second apparatus to a further optical link. And coupling the third port of the second apparatus to a network part arranged to output an upstream optical signal and to receive a downstream optical signal.

DESCRIPTION OF THE DRAWINGS

Preferred embodiments of the present invention will now be described by way of example only with reference to the accompanying drawings, in which:

FIG. 8 shows a protection system according to an embodiment of the present invention;

DETAILED DESCRIPTION

Figure 1:
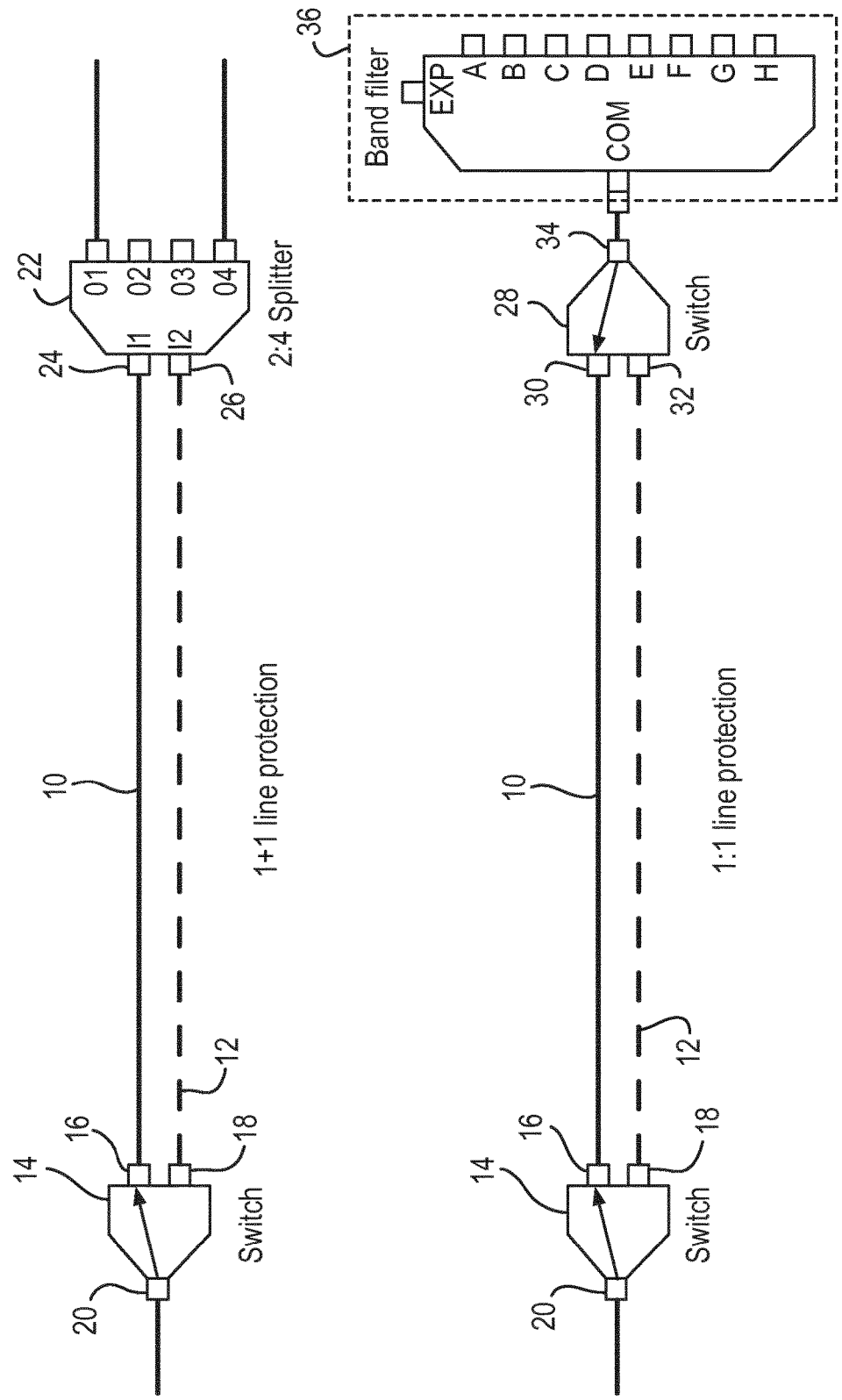
FIGS. 1a and 1b illustrate conventional 1+1 and a 1:1 protection system for an optical link.
Figure 2:
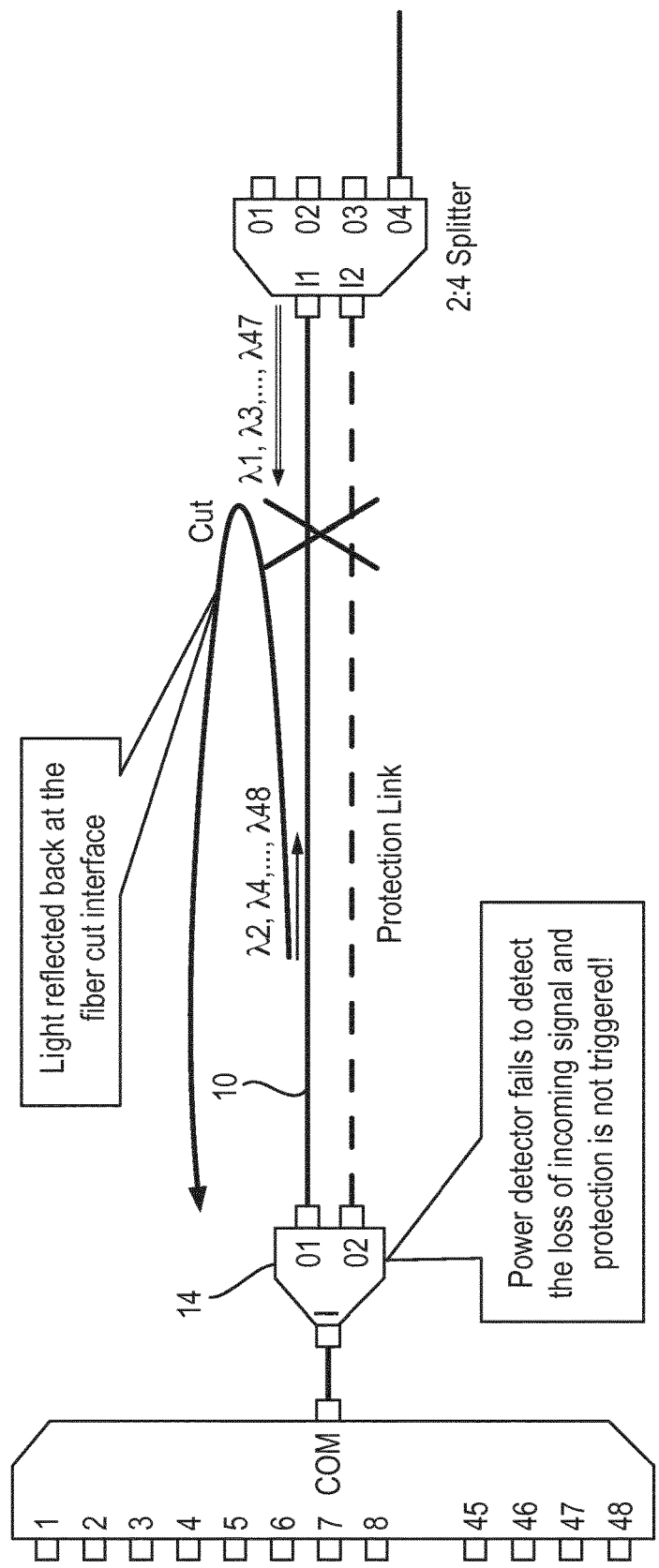
FIG. 2 illustrates why the protection systems shown in FIG. 1 fail if the optical link is arranged to carry downstream optical signals as well as upstream optical signals.
Figure 3:
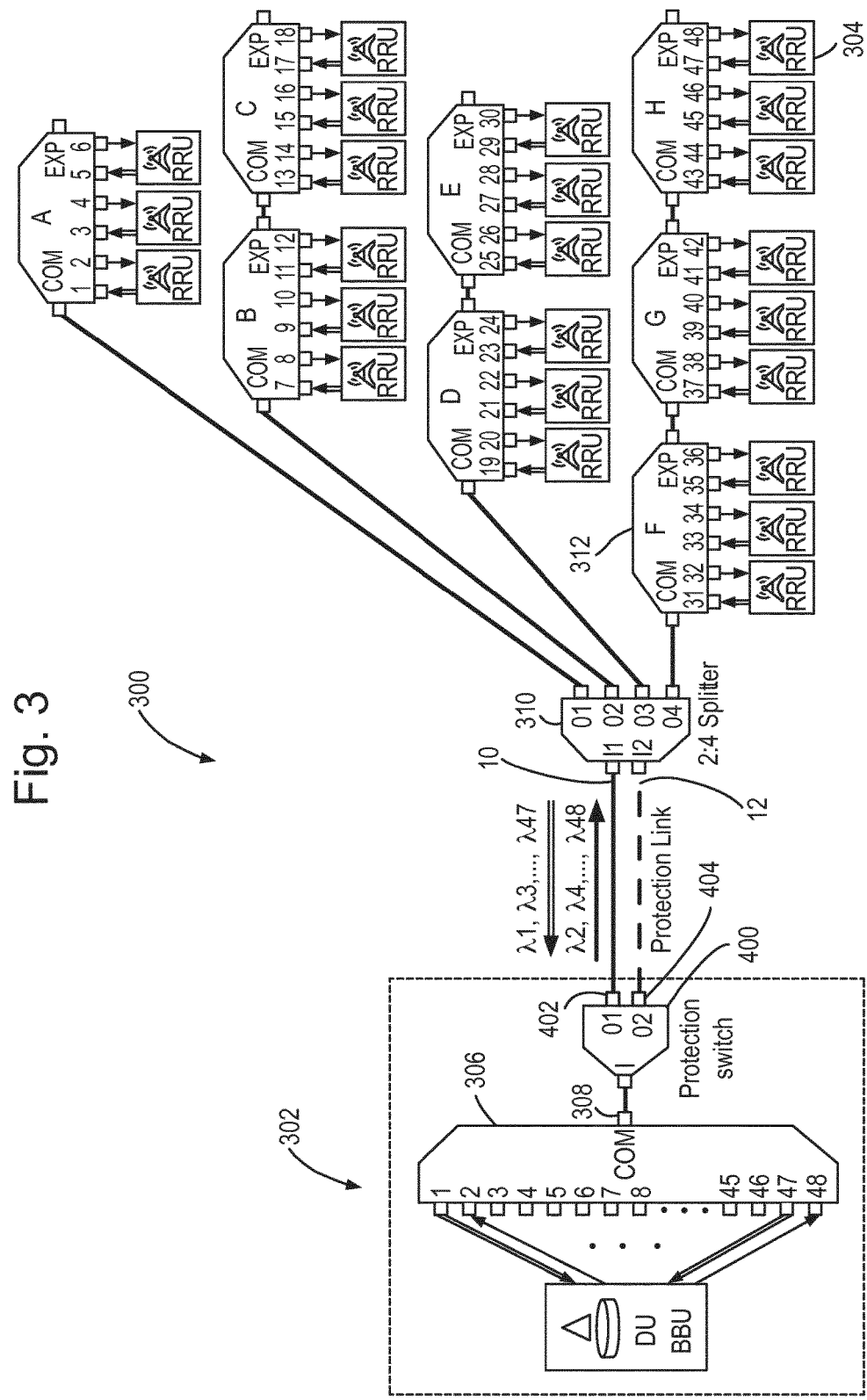
FIG. 3 shows an example of a radio access network comprising an optical network comprising apparatus according to an embodiment of the present invention.

FIG. 3 shows, by way of example, apparatus 400 embodying the present invention arranged to provide protection of an optical link 10 in an optical network within a radio access network 300. However, it should be appreciated that apparatus embodying the present invention may be used to protect an optical link, which is arranged to convey upstream and downstream signals, in any optical network. In this example, the optical link 10 comprises an optical fibre.

In this example, the radio access network 300 is a front-haul network, which has a hub and spoke configuration. The radio access network 300 comprises a baseband unit 302 configured to receive and transmit optical signals to and from a plurality of remote radio units, RRUs 304. Each of the optical signals is at a respective optical wavelength. The upstream optical signals, transmitted from the baseband unit, are at respective wavelengths, odd lambdas 1 to 37. The downstream optical signals, received by the baseband unit 302 from the RRUs 304, are also at respective, different wavelengths, even lambdas 2 to 48.

The baseband unit 302 is coupled to a WDM multiplexer/demultiplexer 306, which is configured to receive each of the upstream optical signals transmitted by the baseband unit 302 and to multiplex the signals into a WDM signal, output from port 308. The WDM multiplexer/demultiplexer 306 is further configured to receive a WDM signal comprising the plurality of downstream optical signals, from the RRUs 304 at port 308, and to de-multiplex and output the respective downstream signals to the baseband unit 302.

In this example, protection apparatus 400 is arranged between the input/output 308 of the multiplexer/demultiplexer 306 and optical link 10, which may be up to a few tenths of a km long. The protection apparatus 400 has a first port 402 coupled to the optical link 10, a second port 404 coupled to a further optical link 12 (which may be referred to as a protection link) and a further port 406, which in this example is coupled to output 308 of WDM multiplexer/demultiplexer.

In this example, the protection scheme is a 1+1 protection scheme, and the other end of the optical link 10, and the protection link 12, is coupled to a 2:n splitter/combiner 310. However, the protection scheme may instead be a 1:1 protection scheme. In that case, a further protection apparatus 400 may be coupled at the other end of the optical link 10 and the protection link 12 instead.

In this example, 2:n splitter combiner 310 is configured to split the upstream optical signals received over the optical link 10 or the protection link 12 (which are from the perspective of 2:n splitter combiner 310, "downstream" optical signals) into a plurality of optical signals, at respective wavelengths. These optical signals are transmitted to respective Optical Add Drop Multiplexers (OADMs) 312. In this example, each OADM 312 is coupled to a respective plurality of RRUs 304. Each RRU 304 is configured to receive a "downstream" optical signal dropped from the OADM 312, at a respective wavelength, and to transmit an "upstream" optical signal, at a respective wavelength. These upstream optical signals are passed by the respective OADM 312 to splitter/combiner 310. Splitter/combiner 310 is configured to combine these upstream optical signals, received from the OADMs 312, and output these upstream optical signals for transmission over optical link 10, and protection link 20.

Figure 4:
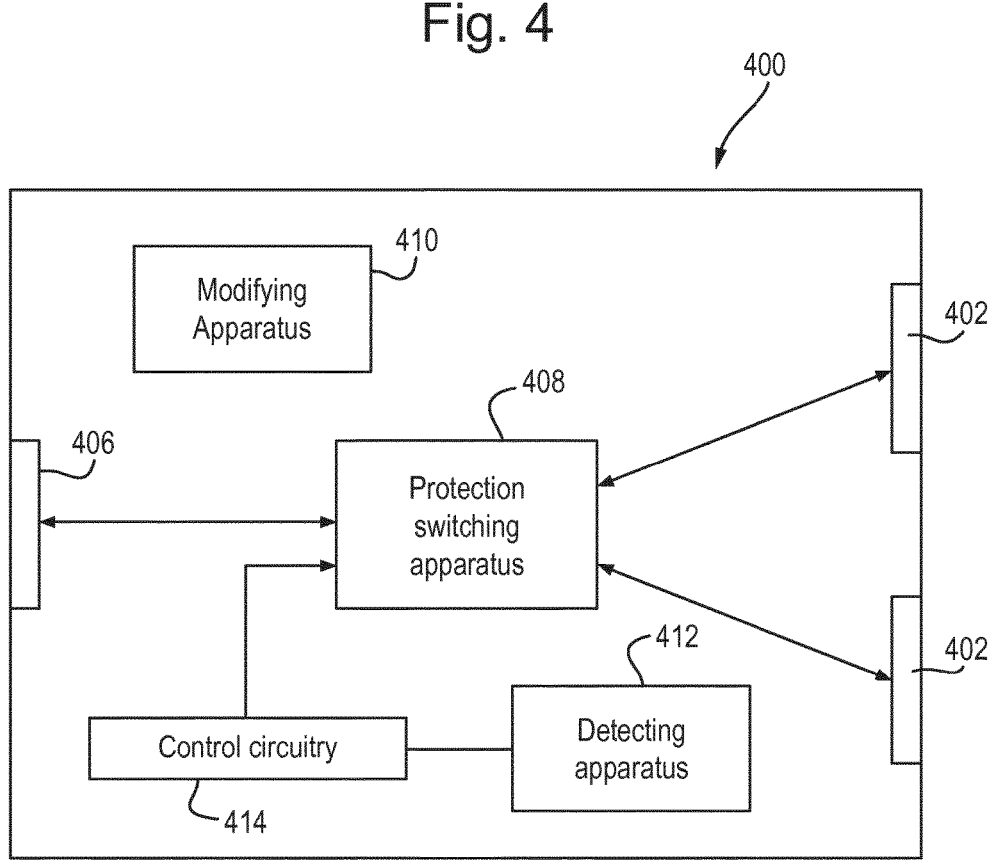
FIG. 4 is a schematic diagram showing apparatus for protecting an optical link according to an embodiment of the present invention.

FIG. 4 shows protection apparatus 400 for protecting an optical link according to an embodiment of the present invention.

The protection apparatus 400 comprises a first port 402, for example an interface, for coupling to an optical link. The protection apparatus 400 further comprises a second port 404, for example an interface, for coupling to a further optical link. Each optical link may comprise an optical fibre. The protection apparatus 400 further comprises a third port 406, which is configured to receive an upstream optical signal to be transmitted over the optical link, and to output a downstream optical signal received of the optical link. The upstream optical signal may comprise one or more optical signals. Similarly the downstream optical signal may comprise one or more downstream optical signals. For example, the third port may be configured to receive a plurality of upstream optical signals to be transmitted over the optical link, for example in the form of a WDM optical signal, and to output a plurality of downstream optical signals, for example also in the form of a WDM optical signal.

The protection apparatus 400 further comprises a protection switching apparatus 408. The protection switching apparatus 408 is coupled between the third port 406, and the first port 402 and the second port 404. The protection switching apparatus 408 is operable to selectively couple the third port 406 to the first port 402 or to the second port 404. This means that, when the third port 406 is coupled to the first port 402, the upstream optical signal and the downstream optical signal can pass therebetween. And, when the third port 406 is coupled to the second port 404, the upstream optical signal and the downstream optical signal can pass therebetween.

The protection apparatus 400 further comprises modifying apparatus 410 configured to modify the upstream optical signal, received at the third port 406, before the upstream optical signal is output from the first port 402, such that the upstream optical signal has a distinctive physical characteristic. This means that, advantageously, the upstream optical signal may be distinguished from the downstream optical signal received over the optical link at the first port 402.

The apparatus 400 further comprises detecting apparatus 412, coupled between the first port 402 and the third port 406. The detecting apparatus 412 is configured to receive (at least) a portion of an incoming optical signal, received at the first port (i.e. an optical signal received at the first port from the optical link). The detecting apparatus 412 is configured to selectively detect the presence of the upstream optical signal or the downstream optical signal in the portion of the incoming optical signal based on the distinctive physical characteristic. For example, the detecting apparatus 412 may be configured to detect the distinctive physical characteristic. The apparatus 400 further comprises control circuitry 414 configured to provide a control signal to the protection switching apparatus based on the detecting by, for example on an output from, the detecting apparatus 412.

For example, the control circuitry 414 may be configured to cause the protection switching apparatus 408 to selectively couple the third port 406 to the second port 404 instead of to the first port 402 if the detecting apparatus 408 detects the presence of the upstream optical signal in the portion of the incoming optical signal. This may comprise, so as to distinguish from (low) reflection occurring during normal operation of the optical link, triggering the protection switching apparatus 408 if the detecting apparatus 408 detects the presence of the upstream optical signal at an optical power indicative of reflection of the upstream optical signal caused by an optical link defect, such as an optical link cut. For example, this may comprise triggering the protection switching apparatus 408 if the detecting apparatus 412 detects the upstream optical signal at a power greater than a predetermined threshold.

Alternatively, the control circuitry 414 may be configured to cause the protection switching apparatus 404 to selectively couple the third port 406 to the second port 404 instead of to the first port 402 if the detecting apparatus 412 does not detect the presence of the downstream optical signal in the portion of the incoming optical signal.

Thus, embodiments of the present invention, advantageously, enable a fault, such as an optical fibre cut, along an optical link to be detected, and thus the optical link to be protected by switching of the traffic (upstream/downstream signals) onto a further (or protection) optical link, in a manner independent of the network wavelength plan.

Figure 5A:
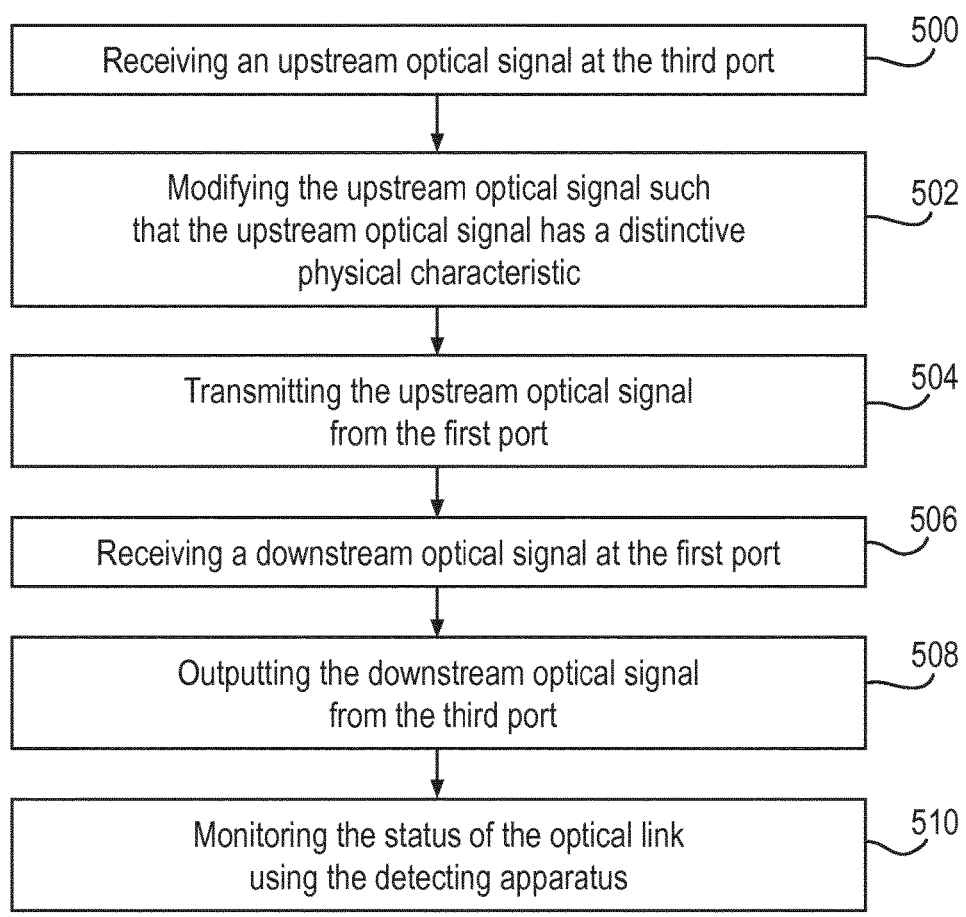
FIGS. 5a and 5b illustrate methods of using the apparatus shown in FIG. 4 according to preferred embodiments of the present invention.
Figure 5B:
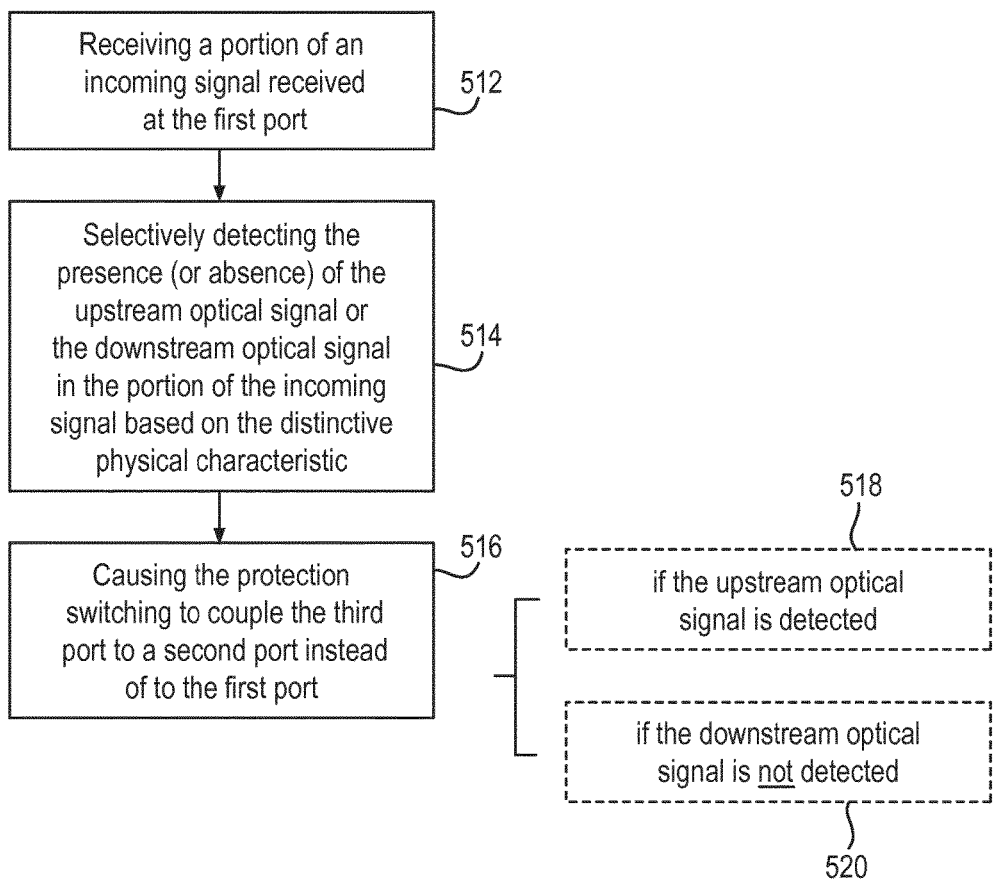

FIGS. 5a and 5b illustrate methods of using the protection apparatus 400 according to embodiments of the present invention, in order to aid understanding.

At step 500, the method comprises receiving an upstream optical signal at the third port 406. At step 502, the method further comprises modifying the upstream optical signal such that the upstream optical signal has a distinctive physical characteristic. At step 504, the method further comprises transmitting the (modified) upstream optical signal from the first port 402 (i.e. for transmission over the first optical link). The method also comprises at 506, simultaneously, receiving a downstream optical signal at the first port 402, and at step 508 outputting the downstream optical signal from the third port 406. The method further comprises, at 516, monitoring the optical link using the detecting apparatus 510.

FIG. 5b illustrates steps performed by the detecting apparatus 412/control circuitry 414 of the protection apparatus 400. It should be noted that the detecting apparatus 412 and the control circuitry 414 may be integrated to any degree.

At step 512 the detecting apparatus 412 receives at least a portion of an incoming optical signal received at the first port 402. At step 514, the detecting apparatus 412 selectively detects the presence (or absence) of the upstream optical signal or the downstream optical signal in the portion of the incoming signal based on the distinctive physical characteristic. At step 414 the control circuitry 414 causes the protection switch 408 to couple the third port 406 to the second port 404 instead of to the first port 402. For example the protection switch 408 may cause the third port 406 to be coupled to the second port 404 instead of to the first port 402, if the upstream optical signal is detected (at a power indicative of a fault) 518 or if the downstream optical signal is not detected 520.

Figure 6:
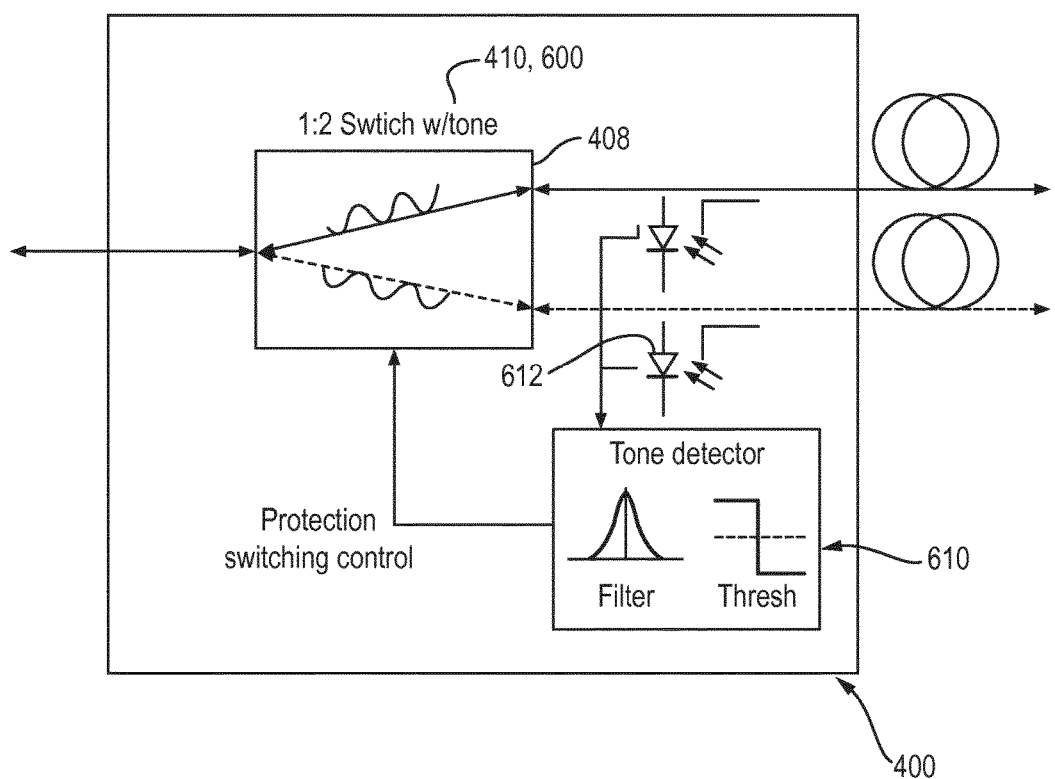
FIG. 6 shows apparatus for protecting an optical link according a preferred embodiment of the present invention.

A preferred embodiment of the protection switching apparatus 400 will now be described with reference to FIG. 6. In this example, the modifying apparatus 410 is modulating apparatus 600 configured to modulate the upstream optical signal, wherein the distinctive physical characteristic is a modulation. In this example, the modulation is an amplitude modulation. However, the modulation could be any type of modulation, such as a phase modulation or a frequency modulation.

Further, in this example, the modulation is advantageously a tone modulation. The modulation is applied at a low frequency of the upstream optical signal, for example less than 5 Hz. It should be noted that the modulation does not carry any digital information and thus is a purely "optical" modulation.

It should be appreciated that the modulating apparatus 600 may be configured in various ways, depending for example on the type of modulation to be applied, as will be understood by those skilled in the art.

Figure 7A:
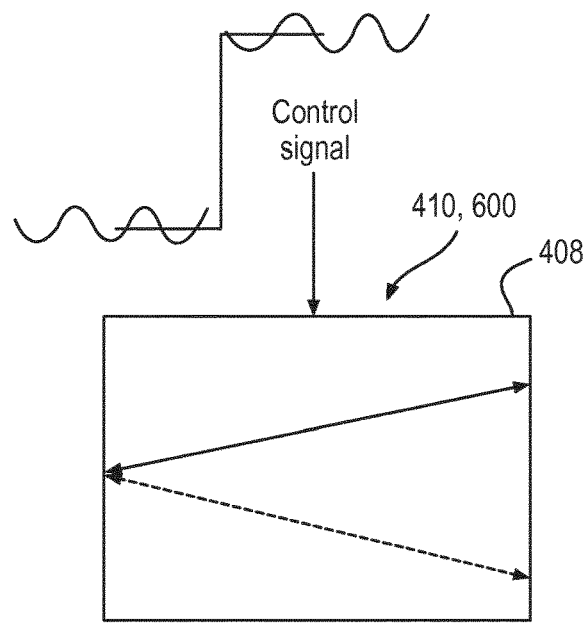
FIG. 7 shows two examples of modulating apparatus according to preferred embodiments of the present invention.

In this example, the modulating apparatus 600 is configured to provide a modulating signal to the protection switching apparatus 408, whereby when the upstream optical signal passes through the protection switching apparatus 408 the modulation is applied to the upstream optical signal. In particular, as shown in FIG. 7a, the modulation may be superimposed onto a control signal 700 provided to the protection switching apparatus 408. Thus, in this case, the modulating apparatus 600 includes the protection switching apparatus 408 itself. This may provide a simple arrangement. However, other arrangements are possible.

Figure 7B:
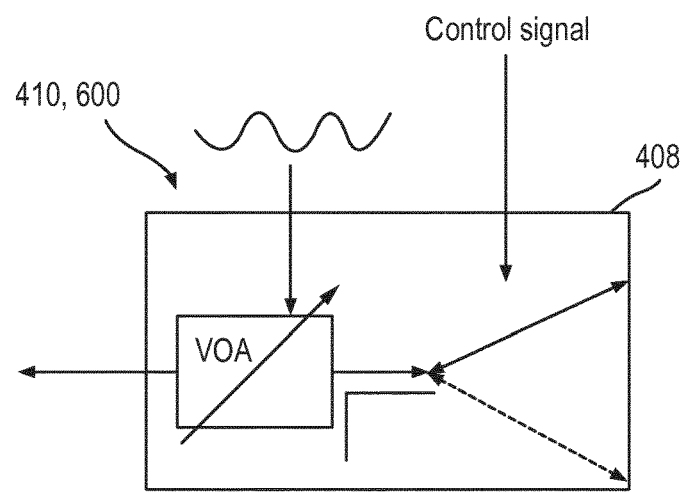
Figure 9:
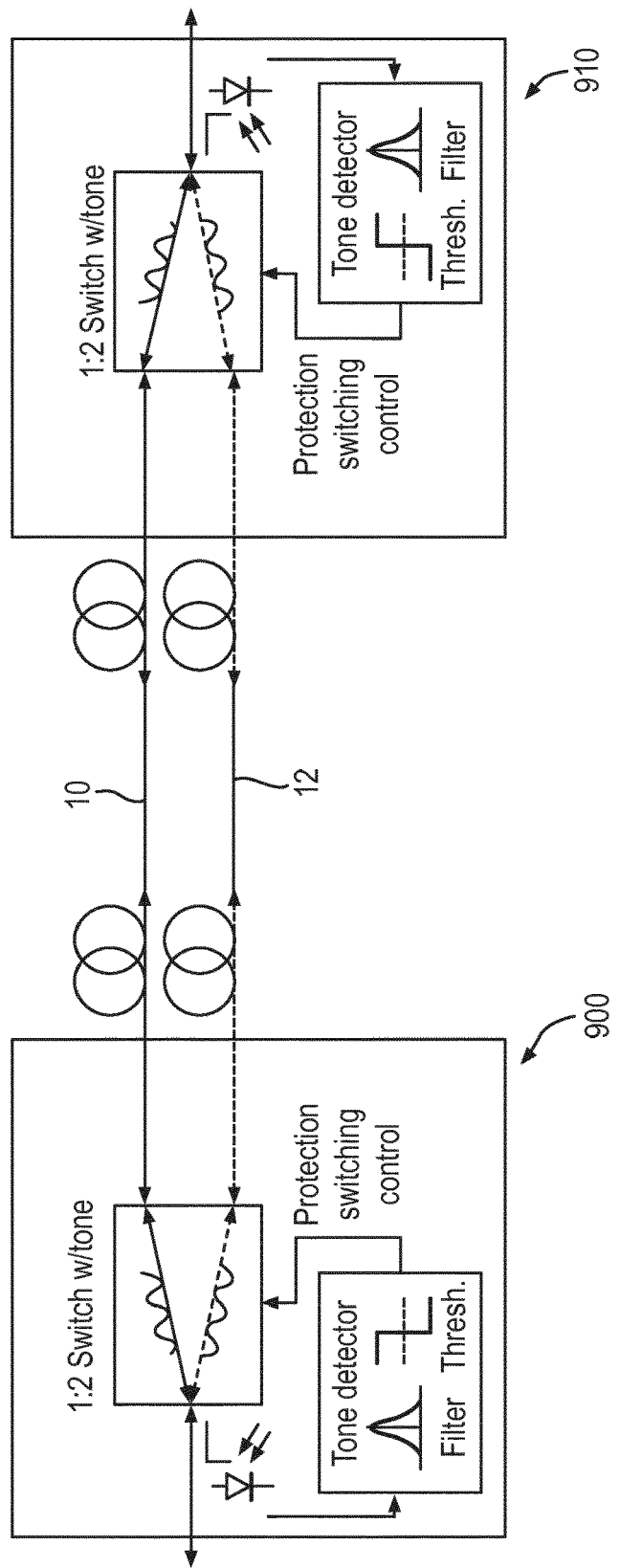
FIG. 9 shows a protection system according to a preferred embodiment of the present invention.

For example, as shown in FIG. 7b, in this example where an amplitude modulation is applied to the upstream optical signal, a variable optical attenuator 710 may be provided along the path of the upstream optical stream. The variable optical attenuator 710 is configured to, in dependence on a control signal, apply the modulation to the upstream optical signal. In the example of FIG. 7b, this variable optical attenuator 710 is integrated into the protection switching apparatus 408. Alternatively, the variable optical attenuator may separate from the protection switching apparatus 408.

It should be noted that in both of these examples the modulating apparatus 600 is arranged such that the modulation is applied to the upstream optical signal, whether the upstream optical signal is subsequently output from the first port 402 or the second port 404. This enables a fault on the "protection" optical link 12, as well as a fault on the optical link 10, to be detected, provided detecting apparatus/control circuitry is arranged accordingly.

However, in alternative arrangements, the modulating apparatus 600 may for example be arranged between the protection switching apparatus 408 and the first port 402, such that the modulation is only applied to an upstream optical signal output from the first port 402. Alternatively, two modulating apparatus 600 may be provided, one between the protection switching apparatus 408 and the first port 402 and one between the protection switching apparatus 408 and the second port 404 to apply respective modulations to upstream optical signals to be transmitted from the respective ports 402, 404.

The protection apparatus 400 may be "revertive", whereby once a fault on the optical link is fixed, traffic is switched back to that optical link. However, alternatively, the traffic may remain on the further optical link. In that case, the optical link may become a "protection" optical link, and traffic may be switched back to the optical link, in the event that a failure of the further optical link is detected.

Referring again to FIG. 6, in this preferred embodiment, the detecting apparatus 412 comprises a modulation detector 610 configured to detect the presence of the modulation in the portion of the incoming optical signal, which in this example is a tone modulation.

In particular, in this embodiment, an optical power detector 612 is coupled to the first port 402. In this example the optical power detector 612 is arranged between the protection switching apparatus 408 and the first port 402. However, other arrangements are possible, so long as, in this embodiment, the optical power detector 612 is coupled to receive a portion of the incoming optical signal before the incoming optical signal passes over the point at which the modulating apparatus 600 applies the modulation. The optical power detector 612 is arranged to receive a portion of an incoming optical signal received at the first port 402, i.e. a portion of the optical signal travelling in the direction from the first port 402 to the third port 406 along an internal path therebetween. A portion of the incoming optical signal may be tapped off for example by a tap (not shown), and passed to the optical power detector 612. The optical power detector 612 is configured to convert the portion of the incoming optical signal into an analog electrical signal. The modulation detector 610 is configured to detect the modulation in the analog electrical signal. First, the analog electrical signal may be passed through a noise filter, to at least partially remove noise from the analog electrical signal. Thus, in this example, the detecting apparatus 412 can detect the presence (or absence) of the upstream optical signal by virtue of the presence (or absence) of the modulation in the portion of the incoming optical signal.

In some embodiments, the detecting apparatus 412 may be configured to compare the presence of the modulation in the analog electrical signal to a threshold. If the modulation is present at an optical power greater than the threshold, or for example if the presence of the modulation increases by a predetermined amount, this may indicate that the optical link 10 is defective, since the upstream optical signal is being reflected back to the apparatus 400 at a level greater than that expected during normal operation. The control circuitry 414 may thus cause the protection switching apparatus 408 to selectively couple the third port 406 to the second port 404 instead of to the first port 402, for example by a providing a control signal to the protection switching apparatus 408.

Thus, in this preferred embodiment, the distinctive physical characteristic is a modulation. However, the distinctive physical characteristic may be any other type of physical characteristic by which the upstream optical can be distinguished from the downstream optical signal.

For example, the modifying apparatus 410 may be configured to add an optical signal to the upstream optical signal at a distinctive frequency, wherein the distinctive frequency is the distinctive physical characteristic. In this example, the detecting apparatus 412 may comprise a wavelength filter configured to selectively pass optical signals at the distinctive frequency. The detecting apparatus 412 may further comprise an optical power detector arranged to receive the optical signals passed by the wavelength filter. If the detecting apparatus 412 detects the presence of the optical signal at the distinctive frequency (for example if the optical power detector detects an optical power greater than that associated with reflection of the signal during normal operation), the control circuitry 414 may trigger the protection switching apparatus 408 to switch the signals onto the protection link.

FIG. 8 shows a system for protecting an optical link according to an embodiment of the present invention.

In this example, a first apparatus 900 is provided at a first end of the optical link, and a second apparatus 910 is provided at a second end of the optical link. In this example, the first apparatus 900 comprises a first port 402 for coupling to a first end of the optical link, and a third port 406 configured to receive an upstream optical signal to be transmitted over the optical link, and to output a downstream optical signal received over the optical link. The second apparatus comprises a first port 402 for coupling to second end of the optical link, a second port 404 for coupling to a further optical link, and a third port 406 configured to receive an upstream optical signal to be transmitted over the optical link, and to output a downstream optical signal received over the optical link.

This protection system operates in a similar way to the protection apparatus 400 described above. However, instead of applying the distinctive physical characteristic at the same apparatus (the second apparatus 910) which detects the presence of the upstream optical signal or downstream optical signal in an incoming signal, based on the distinctive physical characteristic, the distinctive physical characteristic is applied to the "upstream optical signal" transmitted by the first apparatus 900 at the opposite end of the optical link. This "upstream optical signal" is a "downstream optical signal" from the perspective of the second apparatus 910. This protection system may also be used in a 1:1 or a 1+1 protection scheme.

Thus, the first apparatus 900 may comprise modifying apparatus 410 configured to modify the upstream optical signal, received at its third port 406, before it is output from its first port 402, such that the upstream optical signal has a distinctive physical characteristic. The modifying apparatus 410 may be configured as described above.

The second apparatus 910 may further comprise a protection switching apparatus 408 operable to selectively couple its third port 406 to its first port 402 or to its second port 404. The second apparatus 910 further comprises detecting apparatus 412, coupled between its first port and its third port. The detecting apparatus 412 is configured to receive a portion of an incoming optical signal, received at the first port 402, and to selectively detect the presence of the upstream optical signal or the downstream optical signal in the portion of the incoming signal based on the distinctive physical characteristic (added by the first apparatus to the "downstream" optical signal received by the second apparatus). The second apparatus 910 further comprises control circuitry 414 configured to provide a control signal to the protection switching apparatus 408 based on an output from the detecting apparatus 412. The detecting apparatus 412/control circuitry 414 may be configured as described above.

In a 1:1 protection scheme, the first apparatus 900 may further comprise a second port 404 for coupling to a further optical link, and a protection switching apparatus 408 operable to selectively couple the third port to the first port or to the second port. The first apparatus 900 may further comprise detecting apparatus 412, coupled between the first port 402 and the third port 404, configured to receive a portion of an incoming optical signal, received at the first port 402, and to selectively detect the presence of the upstream optical signal or the downstream optical signal in the portion of the incoming signal based on a distinctive physical characteristic. The first apparatus 900 may further comprise control circuitry configured to provide a control signal to the protection switching apparatus 408 based on an output from the detecting apparatus 412.

The detecting apparatus 412 (in the first apparatus 900) may be configured to detect the presence of the upstream optical signal or the downstream optical signal based on the distinctive physical characteristic applied to the upstream optical signal by the modifying apparatus 410 in the first apparatus 900.

Alternatively, the second apparatus 910 may further comprise modifying apparatus 410 configured to modify the upstream optical signal, received at its third port 406, before it is output from its first port 402, such that the upstream optical signal transmitted by the second apparatus 910 (i.e. the "downstream optical signal" received by the first apparatus 900) has a distinctive physical characteristic. In this case, the detecting apparatus 412 in the first apparatus 900 may detect the presence of the upstream optical signal or the downstream optical signal in an incoming signal to the first apparatus, based on this distinctive physical characteristic instead.

FIG. 8 illustrates an example of a protection system according to a preferred embodiment of the present invention in a 1:1 protection scheme. In this example, a protection apparatus (apparatus 900) substantially as described with respect to FIG. 6 is coupled to a first end of the optical link 10 and a first end of the further optical link 12. A further protection apparatus (apparatus 910) substantially as described with respect to FIG. 6 is coupled to a second end of the optical link 10 and to a second end of the further optical link 12. The difference is that the first and second protection apparatus 900 and 910 are configured to detect the modulation applied by the other apparatus 900, 910 respectively. The modulations are different. Thus, in this example, it is possible for the detecting apparatus 412 to be arranged to receive a portion of the incoming optical signal, after the incoming optical signal has traversed the protection switch 408/point at which the modulating apparatus 410 applies the modulation.

Thus, embodiments of the present invention have the advantage that they can provide protection of an optical link arranged to carry both upstream and downstream optical signals (i.e. optical signals travelling in opposite directions), in a simpler, more cost effective and more reliable way than other solutions. Advantageously, the method is independent of the wavelength plan of the optical network, and thus the wavelength plan may be adjusted dynamically so as to improve network performance, without requiring reconfiguration of the apparatus. Further, no modifications are required to other network elements such as OADMs, HUB.

The solution of the present invention is self-contained, and thus advantageously an optical network may be easily upgraded to provide protection of an optical link using apparatus embodying the present invention.

Figure 10A:
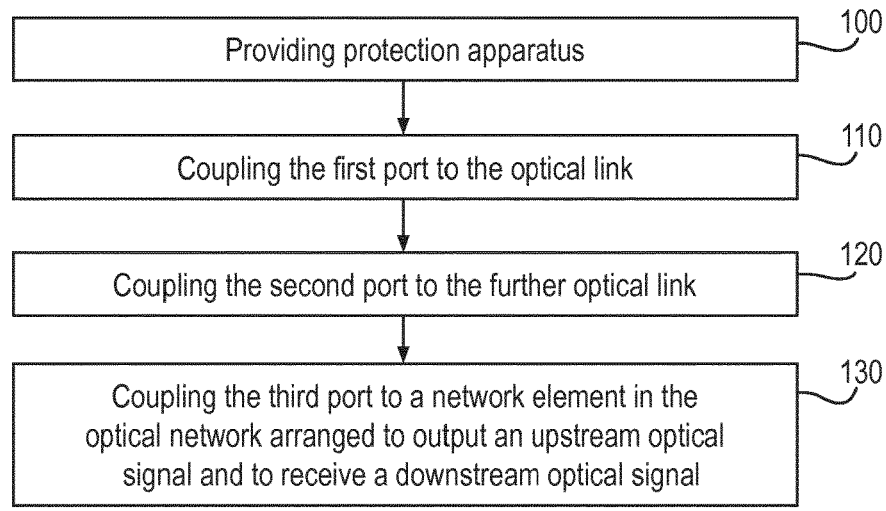
FIGS. 10a and 10b show methods of upgrading an optical network to provide protection of an optical link, according to preferred embodiments of the present invention.

FIG. 10a shows a method of upgrading an optical network to provide protection of an optical link according to an embodiment of the present invention. The method comprises, at 100, providing an apparatus 400 embodying the present invention. At 110, the method comprises coupling the first port 402 of apparatus 400 to the optical link. At 120, the method comprises coupling the second port 404 of the apparatus 400 to the further optical link. At 130, the method further comprises coupling the third port 406 of apparatus 400 to a network part arranged to output an upstream optical signal and to receive a downstream optical signal.

Figure 10B:
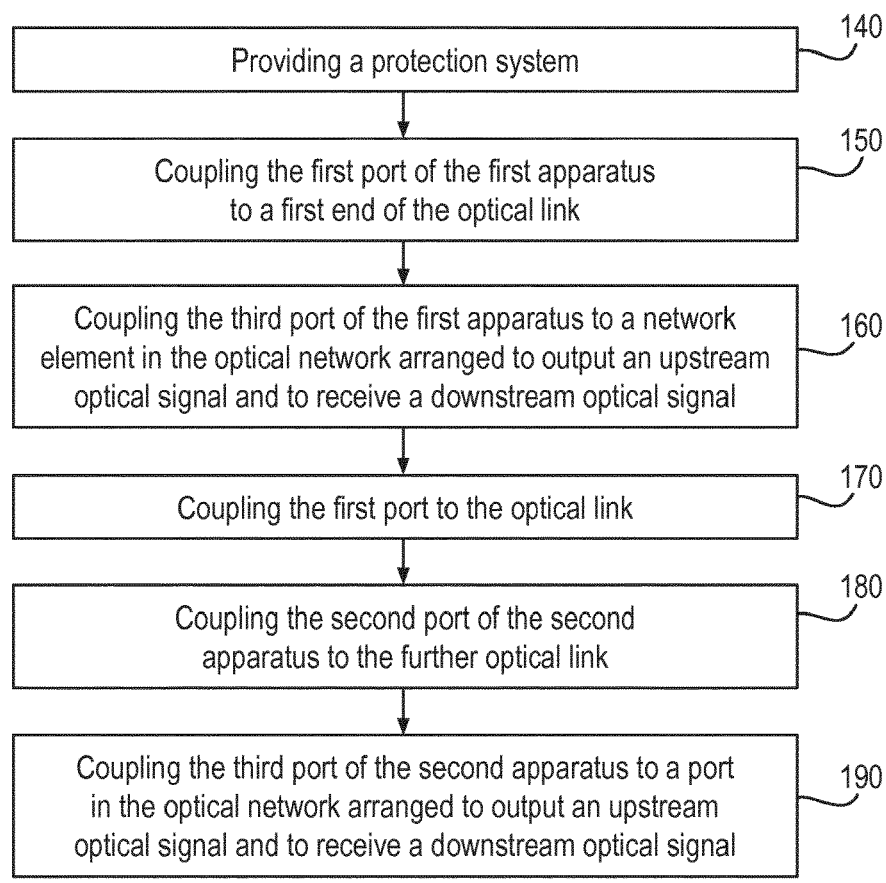

FIG. 10b shows a method of upgrading an optical network to provide protection of an optical link according to a further embodiment of the present invention. The method comprises, at 140, providing a system for protecting an optical link as described above, comprising first apparatus and second apparatus. The method comprises, at 150, coupling the first port of the first apparatus to a first end of the optical link. At 160, the method comprises coupling the third port of the first apparatus to a network part arranged to output an upstream optical signal and to receive a downstream optical signal. At 170, the method comprises coupling the first port of the second apparatus to a second end of the optical link. At 180 the method comprises coupling the second port of the second apparatus to a further optical link. At 190, the method comprises coupling the third port of the second apparatus to a network part arranged to output an upstream optical signal and to receive a downstream optical signal.

The invention claimed is:

1. Apparatus for protecting an optical link, the apparatus comprising:
   a first port for coupling to the optical link;
   a second port for coupling to a further optical link;
   a third port configured to receive an upstream optical signal to be transmitted over the optical link, and to output a downstream optical signal received over the optical link;
   protection switching apparatus operable to selectively couple the third port to the first port or to the second port;
   modifying apparatus configured to modify the upstream optical signal, received at the third port, before it is output from the first port, such that the upstream optical signal has a distinctive physical characteristic;
   detecting apparatus coupled between the first port and the third port, and configured to:
      receive a portion of an incoming optical signal received at the first port; and
      selectively detect the presence of the upstream optical signal or the downstream optical signal in the portion of the incoming signal based on the distinctive physical characteristic; and
   control circuitry configured to provide a control signal to the protection switching apparatus based on a result of the selective detection by the detecting apparatus.

2. Apparatus according to claim 1, wherein the control circuitry is configured to cause the protection switching apparatus to selectively couple the third port to the second port instead of to the first port if the detecting apparatus detects the presence of the upstream optical signal in the portion of the incoming optical signal.

3. Apparatus according to claim 1, wherein the control circuitry is configured to cause the protection switching apparatus to selectively couple the third port to the second port instead of to the first port if the detecting apparatus does not detect the presence of the downstream optical signal in the portion of the incoming optical signal.

4. Apparatus according to claim 1, wherein the modifying apparatus is configured to modulate the upstream optical signal, and wherein the distinctive physical characteristic is a modulation.

5. Apparatus according to claim 4, wherein the modulation is an amplitude modulation.

6. Apparatus according to claim 4, wherein the modulation comprises at least one of a phase modulation and a frequency modulation.

7. Apparatus according to claim 6, wherein the modulation comprises a frequency modulation that is applied at a frequency of the upstream optical signal that is less than 5 Hz.

8. Apparatus according to claim 4, wherein the modulation is a tone modulation.

9. Apparatus according to claim 4, wherein the modulation does not carry information.

10. Apparatus according to claim 4, wherein the modifying apparatus is configured to provide a modulating signal to the protection switching apparatus, whereby when the upstream optical signal passes through the protection switching apparatus the modulation is applied to the upstream optical signal.

11. Apparatus according to claim 4, wherein the detecting apparatus comprises a modulation detector configured to detect the presence of the modulation in the portion of the incoming optical signal.

12. Apparatus according to claim 1, wherein the modifying apparatus is configured to add an optical signal to the upstream optical signal at a distinctive frequency, wherein the distinctive frequency is the distinctive physical characteristic.

13. Apparatus according to claim 12, wherein the detecting apparatus comprises a wavelength filter configured to selectively pass optical signals at the distinctive frequency.

14. A system for protecting an optical link, comprising:
   a first apparatus comprising:
      a first port for coupling to a first end of the optical link;
      a third port configured to receive an upstream optical signal to be transmitted over the optical link, and to output a downstream optical signal received over the optical link;
      modifying apparatus configured to modify the upstream optical signal, received at the third port, before it is output from the first port, such that the upstream optical signal has a distinctive physical characteristic; and
   a second apparatus comprising:
      a first port for coupling to second end of the optical link;
      a second port for coupling to a further optical link;
      a third port configured to receive an upstream optical signal to be transmitted over the optical link, and to output a downstream optical signal received over the optical link;
      protection switching apparatus operable to selectively couple the third port to the first port or to the second port;
      detecting apparatus coupled between the first port and the third port, and configured to:
         receive a portion of an incoming optical signal received at the first port; and selectively detect the presence of the upstream optical signal or the downstream optical signal in the portion of the incoming signal based on the distinctive physical characteristic; and control circuitry configured to provide a control signal to the protection switching apparatus based on a result of the selective detection by the detecting apparatus.

15. An optical network comprising: an optical link; a further optical link; and an apparatus for protecting the optical link according to claim 1.

16. A radio access network comprising an optical network according to claim 15.

17. An optical network comprising: an optical link; a further optical link; and a system for protecting the optical link according to claim 14.

18. A radio access network comprising an optical network according to claim 17.

19. A method of upgrading an optical network to provide protection of an optical link, comprising:

providing an apparatus according to claim 1;

coupling the first port to the optical link;

coupling the second port to a further optical link; and coupling the third port to a network part arranged to output an upstream optical signal and to receive a downstream optical signal.

20. A method of upgrading an optical network to provide protection of an optical link, comprising:

providing a system according to claim 14;

coupling the first port of the first apparatus to a first end of the optical link;

coupling the third port of the first apparatus to a network part arranged to output an upstream optical signal and to receive a downstream optical signal;

coupling the first port of the second apparatus to a second end of the optical link;

coupling the second port of the second apparatus to a further optical link; and coupling the third port of the second apparatus to a network part arranged to output an upstream optical signal and to receive a downstream optical signal.

\* \* \* \* \*